March 15, 1960  W. GEBAUHR  2,928,731
CONTINUOUS PROCESS FOR PURIFYING GALLIUM
Filed Aug. 27, 1956
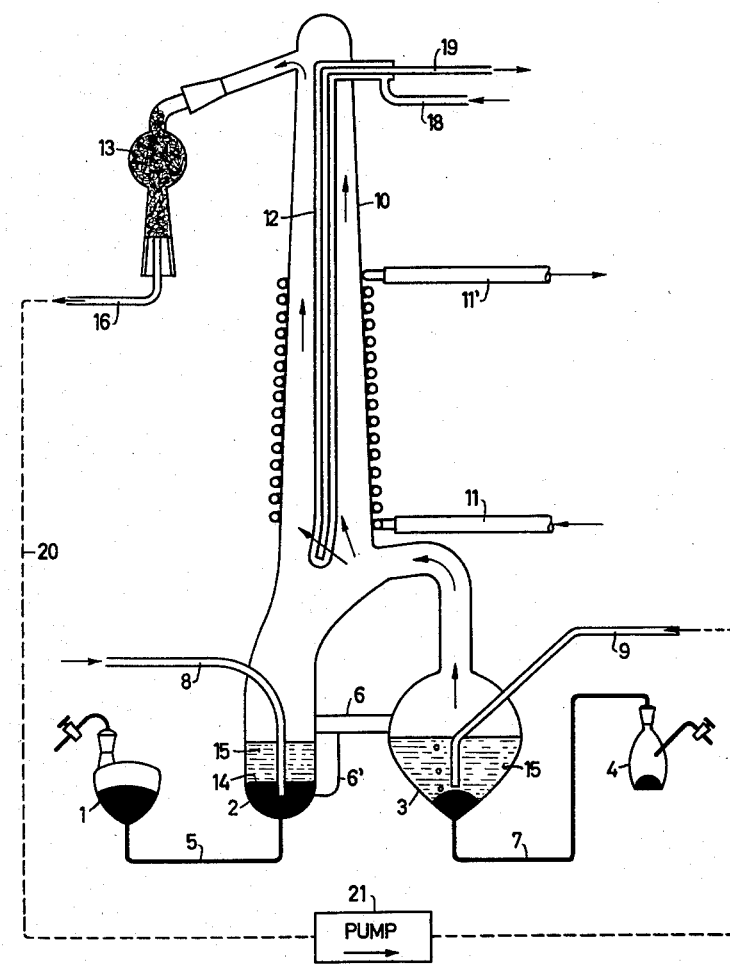

United States Patent Office 2,928,731
Patented Mar. 15, 1960

2,928,731
CONTINUOUS PROCESS FOR PURIFYING GALLIUM

Werner Gebauhr, Erlangen, Germany, assignor to Siemens-Schuckertwerke Aktiengesellschaft, Berlin-Siemensstadt and Erlangen, Germany, a corporation of Germany Application August 27, 1956, Serial No. 606,389
Claims priority, application Germany September 6, 1955
6 Claims. (Cl. 75—84.5)

This invention is directed to a continuous process for purifying gallium, and to an apparatus employed to carry out this process.

As is well known, gallium has technical uses of increasing importance. The purest commercially available gallium is produced by first liberating the raw material from coarse impurities in aqueous solution by conventional methods, and then electrolytically precipitating the gallium in relatively pure form from an alkaline solution. The purity of the gallium thus produced is insufficient for certain applications such as for use as a component of semiconducting compounds.

It is an object of my invention to provide a method and apparatus for the continuous production of gallium in a degree of purity far exceeding the purity heretofore obtainable.

According to the invention, I first convert previously purified gallium into gallium trichloride ($GaCl_3$) by reaction with chlorine or chlorine compounds. Then I reduce the gallium trichloride, by heating it together with previously purified commercial gallium, to yield gallium dichloride ($GaCl_2$). Thereafter I subject the gallium dichloride to further heating in order to decompose it into gallium trichloride and gallium. The gallium trichloride, which is gaseous at the decomposition temperature, is exhausted and is condensed by cooling so that it again becomes available for reduction with pre-purified gallium into gallium dichloride which is then subjected to disproportioning, or decomposition, so that no further reaction medium need be supplied from the outside. The method can be started with the commercially available electrolytic gallium described above. It is advantageous to subject this electrolytic gallium, prior to applying the method according to the invention, to purification by means of concentrated sulphuric acid.

According to other features of the invention, the novel method is performed in an apparatus composed of four vessels which are connected in series by means of intermediate conduits. The two intermediate vessels are provided with an inlet conduit, and are bridged by a cooler or condenser which is connected with an exhaust through a drying zone.

The invention thus provides, for the first time, a technically feasible continuous method and also a practically applicable apparatus for purifying gallium by means of the disproportioning phenomenon.

As starting material I employ electrolytic gallium produced in the manner described above. This I preheat with concentrated sulphuric acid, which eliminates to a large extent coarse impurities such as copper. The pre-purified gallium is converted into gallium trichloride by reaction with hydrogen chloride gas. Instead of hydrogen chloride gas the reaction may also be carried out with chlorine gas. However, the latter is less favorable than gaseous hydrogen chloride because the greater oxidizing effect of chlorine may in certain cases result in an excessive and undesired degree of reaction with nobler impurity metals. The gallium trichloride resulting from the reaction is reduced by heating it together with a further amount of the starting gallium. The gallium dichloride thus obtained is caused to become disproportioned by heating it to a temperature of 300° C. to 350° C. As a result, gallium trichloride is formed together with metallic gallium which possesses a high degree of purity. It will be recognized that the method according to the invention progresses in accordance with the following three sequential reactions:

(1)  $2Ga + 6HCl = 2GaCl_3 + 3H_2$
(2)  $2GaCl_3 + Ga = 3GaCl_2$
(3)  $3GaCl_2 \rightarrow 2GaCl_3 + Ga$ In order to make certain that the disproportioning takes place only in the sense of the Equation 3, it is necessary to eliminate the $GaCl_3$ resulting from the disproportioning. Since $GaCl_3$ is gaseous at the disproportioning temperature it can readily be eliminated by means of a flow of inert gas, for instance by means of a current of nitrogen. The $GaCl_3$ vapors are precipitated within the cooler or condenser, and therefore are again available for reduction with the starting gallium into gallium dichloride. This cycle of operation can be continuously repeated with newly supplied starting gallium without requiring the supply of further reaction agents from the outside.

A preferred embodiment of the method and apparatus is illustrated in the drawing.

The apparatus for performing the method is composed of four vessels 1, 2, 3 and 4 which are connected in series by means of connecting conduits 5, 6 and 7. The vessels 2 and 3 are each provided with an incoming supply conduit, which is numbered 8 in the first case and 9 in the second. The vessels 2 and 3 are further interconnected or bridged by the cooler or condenser 10. The exterior walls of the cooler 10 are subjected to a coolant flowing through a cooling-water coil or hose 11, 11', which is tightly seated upon the cooler 10. The coil 11 is assisted in effecting the cooling by a cooling finger 12 which is likewise traversed by cooling water supplied and removed through pipes 18 and 19. The cooler is connected to an exhaust pipe 16 through a drying zone 13 which serves as a seal against ingress of moisture from the ambient air.

The operation of the process and apparatus is as follows:

The starting gallium is placed in the vessel 1 at a temperature of about 50° C. and passes through the connecting conduit 5 into the vessel 2. It is preferable to design the connecting conduit 5 as a capillary. This feature, in conjunction with the design of the lower portion of vessel 1, as illustrated in the drawing, promotes the occurrence of a liquation purifying effect, which has been definitely ascertained by spectroscopic observation. This effect is substantially a process of separating a fusible substance from one less fusible by means of heat. A current of gaseous hydrogen chloride is introduced through the pipe 8 into the gallium which is denoted by 14, at the bottom of the vessel 2. As a result, and aided by heating the gallium to a temperature preferably below the boiling point of $GaCl_3$, for example at about 180° C., the gallium is converted to $GaCl_3$. If the current of hydrogen chloride is interrupted the excessive amount of gallium reduces the $GaCl_3$ to $GaCl_2$. The latter compound is conveyed through the connecting conduit 6 into the vessel 3, for example by applying increased pressure to the vessel 1 so that the level of the gallium in vessel 2 is raised. Pipe 6' serves for return of gallium to vessel 2, or for pressure equalization. The liquid $GaCl_2$ in vessels 2 and 3 is denoted by 15. The vessel 3 is kept at a temperature between 300° C. and 350° C. This temperature causes disporportioning of the $GaCl_2$ to a mixture of $GaCl_3$ and gallium. The gallium settles at the bottom of the vessel and can be sucked off through the connecting conduits 7 into the vessel 4, for instance by producing negative pressure within the vessel 4. The connecting conduit 7, which is similar to conduit 5, is preferably designed as a capillary in order to promote the occurrence of the purification by liquation effect in coaction with the design of the bottom of vessel 3.

The $GaCl_3$ liberated in gaseous form by the disproportioning action in vessel 3 is exhausted into the cooler 10 in the direction of the illustrated arrows. This is done by means of a current of neutral or inert gas. For example, a current of nitrogen is passed into vessel 3 through the supply pipe 9. Within the cooler 10 the $GaCl_3$ is completely condensed so that practically no $GaCl_3$ passes through the cooler 10 into the exhaust pipe 16. Only the nitrogen gas passes through the cooler and the dryer 13 into the exhaust 16. For large-scale manufacture, the nitrogen gas can optionally be recycled from exhaust pipe 16 through pipe 20, pump 21, and inlet pipe 9 back into the vessel 3. The nitrogen may be pre-heated or cooled for temperature control.

The $GaCl_3$ precipitated in the cooler 10 is melted by heating so that it will flow into the vessel 2. It suffices for this purpose to interrupt the flow of coolant or, if desired, a heating liquid may be passed through the coil 11 and the cooling finger 12. In the alternative, two coolers arranged in parallel may be employed, one being heated to melt the accumulation of solid gallium trichloride while the other is in operation to condense gallium trichloride vapor. Thereafter, the above-described operation repeats itself. That is, the $GaCl_3$ is reduced by a further amount of starting gallium in vessel 2 to form $GaCl_2$. The $GaCl_2$ is then conveyed through the connecting conduit 6 into the vessel 3 where it becomes disproportioned, and so forth, in the manner described above.

For heating the vessels 2 and 3 for the above-described purposes, the use of electric resistance heating by means of a heating cord or cable has been found satisfactory. The heat-radiation from the vessels 2 and 3 is sufficient to maintain the gallium in the adjacent vessels 1 and 4 in liquid condition. The apparatus may be made of Pyrex or Jena-glass, or it may be made of quartz.

The gallium recovered in vessel 4 possesses a very much higher degree of purity than the starting gallium. By means of spectroscopic observation only traces of copper and iron could be ascertained, both being present in quantities very much smaller than is found in the starting gallium. This purifying effect may be explained by the fact that in the system $GaCl_2/Ga$ present in the vessels 2 and 3, all of the said elements arrange themselves in accordance with their affinity with the chloride ion. That is, all elements which are less noble than gallium tend to be located within the melt of gallium dichloride, and only the elements nobler than gallium will remain in the gallium. Virtually, this means that in the gallium occurring in the vessel 4, only such spectroscopically ascertainable elements will occur which have equal or greater affinity to the chloride ion and which become disproportioned. Such elements cannot, or can only be partially removed from the gallium by the method according to this invention.

The high degree of purity of gallium produced by this invention permits its use as a component of electric semi-conducting compounds, or for other purposes in which extreme purity is required, such as in high-temperature thermometers or in cooling systems.

It is understood that the invention includes modification of the process and apparatus within the spirit of this disclosure and the terms of the appended claims.

Although I have set forth a theory of the reactions taking place in the reactor 2 the scope of the invention is not to be delimited thereby. The over-all result is a continuous process in which gallium trichloride, recycled from the condenser above the decomposition or disproportioning chamber 3, is reacted with gallium in reactor 2 to yield gallium dichloride which then flows into disproportionating chamber 3. After the first reaction of the gallium metal with HCl, the current of HCl is discontinued. Each subsequent conversion of gallium metal to $GaCl_2$ is effected only by reaction with the $GaCl_3$ recovered by the cooler.

The cooler or condenser 10 is operated at temperatures below the melting point of gallium trichloride, preferably below 50° C., to precipitate or condense gallium trichloride in solid phase. Conventional equipment may be employed to keep the condenser clear. From a practical viewpoint, operation of cooler 10 at temperatures above the melting point and below the boiling point of gallium trichloride, which is about 199.6° at standard pressure, is not feasible.

For large scale operation the reactor 2 may be utilized or it may be replaced by conventional counter-current reactor-stills in which the liquid gallium and the returned condensed and liquefied gallium trichloride are passed downwardly over baffles and the like and the hydrogen chloride gas upwardly.

The temperature in reactor 2 is subject to some variation in accordance with the pressure or vacuum conditions adopted for operation of this process.

The electrolytic purification of gallium is conventional, for example it is described in U.S. Patent 2,582,377. The sulfuric acid purification of gallium is carried out as follows.

The gallium metal to be purified is liquefied by heating in a container. Concentrated sulphuric acid of highest purity is then added in such quantity that the gallium is just covered by the acid. The container is then kept at a temperature between 60° and 80° C. for a short period of time, for example, about five minutes. A skin is formed on the surface of the gallium which contains the impurities. Its thickness depends upon the degree of impurity of the gallium. The purified gallium located beneath the skin can then be withdrawn by means of a pipette.

I claim:

1. A cyclic process of purifying gallium comprising treating, in a first reaction zone, a body of molten, partially purified gallium with a current of gas taken from the group consisting of hydrogen chloride and chlorine at a temperature below that at which the gallium trichloride produced boils, interrupting the current so that the body of unreacted excess molten gallium reduces the gallium trichloride to the dichloride, raising the level of the body of molten gallium to assist in decanting a supernatant layer of liquid gallium dichloride, decanting said layer into a second reaction zone, maintaining said second reaction zone at between about 300° to 350° C. to cause conversion of the gallium dichloride to gallium trichloride in gaseous form and purified gallium in liquid form, withdrawing the purified gallium, the conversion being facilitated by passing a current of inert gas through the liquid gallium dichloride, passing said current laden with gallium trichloride through a condensing zone, returning the condensed trichloride to the first reaction zone for reaction with the body of molten gallium to produce gallium dichloride, and again passing the gallium dichloride into the second reaction zone for conversion into purified gallium and gallium trichloride.

2. A cyclic process of purifying gallium comprising treating, in a first reaction zone, a body of molten, partially purified gallium with a current of hydrogen chloride gas at a temperature below that at which the gallium trichloride produced boils, interrupting the current so that the body of unreacted excess molten gallium reduces the gallium trichloride to the dichloride, raising the level of the body of molten gallium to assist in decanting a supernatant layer of liquid gallium dichloride, decanting said layer into a second reaction zone, maintaining said second reaction zone at between about 300° to 350° C. to cause conversion of the gallium dichloride to gallium trichloride in gaseous form and purified gallium in liquid form, withdrawing the purified gallium, the conversion being facilitated by passing a current of inert gas through the liquid gallium dichloride, passing said current laden with gallium trichloride through a condensing zone, returning the condensed trichloride to the first reaction zone for reaction with the body of molten gallium to produce gallium dichloride, and again passing the gallium dichloride into the second reaction zone for conversion into purified gallium and gallium trichloride.

3. The process described in claim 2 in which the starting gallium is gallium purified by electrolytic precipitation from alkaline solution.

4. The process described in claim 3 in which the starting gallium is gallium further purified by treatment with concentrated sulfuric acid.

5. The process of claim 2 in which the inert gas is nitrogen.

6. The process of claim 2 in which the starting gallium is continuously fed into the bottom region of the first reaction zone through a capillary, and the purified gallium is continuously removed from the bottom region of the second zone by suction through another capillary, and the inert gas is removed from the condensing zone through a drying zone which prevents ingress of moisture from the atmosphere.

References Cited in the file of this patent
UNITED STATES PATENTS

| | | |
|---|---|---|
| 1,576,083 | Boyer | Mar. 9, 1926 |
| 2,564,337 | Maddex | Aug. 14, 1951 |
| 2,670,270 | Jordan | Feb. 23, 1954 |
| 2,785,973 | Gross et al. | Mar. 19, 1957 |

OTHER REFERENCES

Thorpe et al.: Thorpe's Dictionary of Applied Chemistry, 4th Edition, vol. V, pages 418–420.